United States Patent
Ghabra et al.

(10) Patent No.: US 10,756,418 B2
(45) Date of Patent: Aug. 25, 2020

(54) ANGLE OF ARRIVAL (AOA) ANTENNA ASSEMBLY FOR PASSIVE ENTRY PASSIVE START (PEPS) BASE STATION

(71) Applicant: Lear Corporation, Southfield, MI (US)

(72) Inventors: Riad Ghabra, Northville, MI (US); Osman Ahmed, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/396,841

(22) Filed: Apr. 29, 2019

(65) Prior Publication Data

US 2020/0014099 A1 Jan. 9, 2020

Related U.S. Application Data

(60) Provisional application No. 62/693,496, filed on Jul. 3, 2018.

(51) Int. Cl.
| | |
|---|---|
| *H01Q 1/32* | (2006.01) |
| *H01Q 1/38* | (2006.01) |
| *G01S 13/74* | (2006.01) |
| *G01S 7/02* | (2006.01) |
| *B60R 25/24* | (2013.01) |
| *B60R 25/20* | (2013.01) |
| *H04W 88/08* | (2009.01) |

(52) U.S. Cl.
CPC ......... *H01Q 1/3233* (2013.01); *B60R 25/209* (2013.01); *B60R 25/245* (2013.01); *G01S 7/025* (2013.01); *G01S 7/026* (2013.01); *G01S 13/74* (2013.01); *H01Q 1/38* (2013.01); *B60R 2325/205* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,592,181 A * | 1/1997 | Cai | G01S 5/04 342/442 |
| 6,104,346 A | 8/2000 | Rudish et al. | |
| 6,885,344 B2 | 4/2005 | Mohamadi | |
| 7,868,745 B2 | 1/2011 | Schmidt et al. | |
| 8,755,469 B1 * | 6/2014 | Su | H04L 27/0012 375/262 |
| 9,380,428 B1 * | 6/2016 | Dame | H04B 7/18504 |
| 9,501,884 B2 * | 11/2016 | McIntyre | G07C 9/00309 |

(Continued)

*Primary Examiner* — K. Wong
(74) *Attorney, Agent, or Firm* — Brooks Kushman P.C.

(57) ABSTRACT

A base station of a vehicle includes an angle of arrival (AoA) antenna assembly and a controller. The AoA antenna assembly is positioned at a known location of the vehicle. The AoA antenna assembly includes a pair of antennas on a printed circuit board to detect an angle of arrival of a wireless signal as received by the AoA antenna assembly from a portable remote control. The wireless signal may be a Bluetooth™, a Bluetooth™ low energy (BLE), a Wi-Fi™, or an ultra-wideband (UWB) wireless signal. The remote control may be in the form of a phone or a key fob. The controller uses the detected angle and the known location of the AoA antenna assembly to locate the portable remote control relative to the vehicle. The controller may perform a passive entry passive start (PEPS) operation of the vehicle as a function of the location of the remote control.

18 Claims, 4 Drawing Sheets

(56) References Cited

U.S. PATENT DOCUMENTS

| | | | |
|---|---|---|---|
| 9,715,768 B2* | 7/2017 | Ampomah | B60R 25/33 |
| 9,967,713 B2* | 5/2018 | Buchheim | H04W 4/026 |
| 10,119,512 B2* | 11/2018 | Kang | F02N 11/0807 |
| 10,393,857 B2* | 8/2019 | Hiscock | H04W 64/00 |
| 2004/0235497 A1 | 11/2004 | Zekavat | |
| 2006/0022866 A1 | 2/2006 | Walton et al. | |
| 2011/0148578 A1 | 6/2011 | Aloi et al. | |
| 2015/0379859 A1 | 12/2015 | Nespolo | |
| 2017/0018128 A1 | 1/2017 | Berezin et al. | |
| 2017/0026910 A1 | 1/2017 | Scheim et al. | |
| 2018/0090992 A1* | 3/2018 | Shrivastava | G02F 1/163 |

* cited by examiner

ANGLE OF ARRIVAL (AOA) ANTENNA ASSEMBLY FOR PASSIVE ENTRY PASSIVE START (PEPS) BASE STATION

CROSS-REFERENCE TO RELATED APPLICATIONS

This application claims the benefit of U.S. Provisional Application No. 62/693,496, filed Jul. 3, 2018, the disclosure of which is hereby incorporated in its entirety by reference herein.

TECHNICAL FIELD

The present disclosure relates to passive entry passive start (PEPS) systems employing consumer mobile devices such as smartphones as portable remote controls.

BACKGROUND

Passive entry systems include a portable remote control and a base station. The remote control is carried by a user. The base station is at a target such as a vehicle. The remote control and the base station wirelessly communicate with one another for remotely controlling the vehicle.

Passive entry functions provided by a vehicular passive entry system include automatically unlocking vehicle doors when the remote control (which will be assumed to be authorized for discussion purposes) is detected near the vehicle.

The location of the remote control relative to the vehicle should be detected as the user in possession of the remote control can unlock the vehicle by simply manipulating the door handle. The remote control should be in proximity to the vehicle before unlocking the vehicle. Otherwise, unauthorized users may be able to unlock the vehicle whenever the remote control is within the general vicinity of the vehicle.

Traditionally, the portable remote control was in the form of a key fob. Smartphones, and other wearable devices such as smart watches, are increasingly being provided with key fob functionality and are thereby taking the place of key fobs.

SUMMARY

A base station of a vehicle includes one or more angle of arrival (AoA) antenna assemblies positioned about the vehicle. A function of each antenna assembly is to detect the angle from which wireless signals for receipt by the base station are emanating from a portable remote control. The remote control may be in the form of a key fob or in the form of a portable, consumer mobile device. The consumer mobile device may be a smartphone ("phone" or "cellphone") a wearable device computer device such as a smartphone or earbuds, a tablet, or the like. In exemplary embodiments described herein, the remote control is a phone.

In operation, the base station uses the detected angles in conjunction with other information such as the known locations of the antenna assemblies to locate the phone with respect to the vehicle (i.e., locate the location of the phone). The subject of this disclosure includes design details of the antenna assemblies. Such design details enable the antenna assemblies to be used as part of a vehicular passive entry passive start (PEPS) system which utilizes a phone in place of a key fob as a portable remote control. The AoA antenna design make the antenna assemblies suitable for a vehicle while being able to perform the AoA functionality, which is namely to help measure the angle of incidence of a received wireless signal. The AoA antenna design further satisfy mounting and packaging requirements of vehicular (PEPS) systems.

An embodiment provides a base station of a vehicle. The base station includes an angle of arrival (AoA) antenna assembly and a controller. The AoA antenna assembly is positioned at a known location of the vehicle. The AoA antenna assembly includes a first pair of antennas on an outer layer of a printed circuit board (PCB) to detect an angle of arrival of a wireless signal as received by the AoA antenna assembly from a portable remote control. The controller uses the detected angle and the known location of the AoA antenna assembly to locate the portable remote control relative to the vehicle.

The base station may further include a plurality of the AoA antenna assemblies positioned at respective known locations of the vehicle. In this case, the controller further uses detected angles of the wireless signal as received by the plurality of AoA antenna assemblies and the known locations of the plurality of AoA antenna assemblies to locate the portable remote control relative to the vehicle.

The wireless signal may be a Bluetooth™ wireless signal or a Bluetooth™ low energy (BLE) wireless signal. In this case, the portable remote control may be a phone.

The wireless signal may be a Bluetooth™ wireless signal, a Bluetooth™ low energy (BLE), a Wi-Fi™ wireless signal, or an ultra-wideband (UWB) wireless signal. In this case, the portable remote control may be a phone or a key fob.

The AoA antenna assembly may further include a second pair of antennas on the outer layer of the PCB to detect the angle of arrival of the wireless signal as received by the AoA antenna assembly from the portable remote control. In this case, the first pair of antennas includes a first antenna and a second antenna spaced apart from one another along a first line and the second pair of antennas includes a third antenna and a fourth antenna spaced apart from one another along a second line spaced apart from and parallel to the first line. The first pair of antennas may operate with one of vertical polarization and horizontal polarization and the second pair of antennas may operate with the other one of vertical polarization and horizontal polarization. The controller is operable to implement a pairing of the antennas and to change the pairing of the antennas during operation of the AoA antenna assembly.

The antennas may operate with circular polarization, vertical polarization, or horizontal polarization. The antennas may be implemented as PCB trace antennas, patch antennas, or surface mount antennas other than patch antennas. The antennas may operate at a 100 MHz bandwidth with a center frequency of 2.4425 GHz.

The AoA antenna assembly may further include a ground plane and a plurality of electronic components. In this case, the ground plane is an intermediate layer of the PCB and the electronic components are on an outer layer of the PCB opposite to the outer layer of the PCB on which the antennas are on. The electronic components are connected to the antennas to enable the operation of the AoA antenna assembly.

The controller is operable to perform a passive entry operation of the vehicle as a function of the location of the portable remote control relative to the vehicle and/or a passive start operation of the vehicle as a function of the location of the portable remote control relative to the vehicle.

Another embodiment provides a method for use by a base station of a vehicle. The base station includes an AoA antenna assembly and a controller. The AoA antenna assembly is positioned at a known location of the vehicle and includes a first pair of antennas on a PCB. The method includes detecting, by the controller, an angle of arrival of a wireless signal as received by the AoA antenna assembly from a portable remote control. The method further includes using, by the controller, the detected angle and the known location of the AoA antenna assembly to locate the portable remote control relative to the vehicle.

The base station may further include a plurality of the AoA antenna assemblies positioned at respective known locations of the vehicle. In this case, the method further includes detecting, by the controller, angles of arrival of the wireless signal as received by the plurality of AoA antenna assemblies from the portable remote control; and using, by the controller, the detected angles and the known locations of the plurality of AoA antenna assemblies to locate the portable remote control relative to the vehicle.

The AoA antenna assembly may further include a second pair of antennas on the outer layer of the PCB to detect the angle of arrival of the wireless signal as received by the AoA antenna assembly from the portable remote control, the first pair of antennas includes a first antenna and a second antenna spaced apart from one another along a first line and the second pair of antennas includes a third antenna and a fourth antenna spaced apart from one another along a second line spaced apart from and parallel to the first line. In this case, the method further includes detecting, by the controller, an angle of arrival of the wireless signal as received by the first pair of antennas from the portable remote control; detecting, by the controller, an angle of arrival of the wireless signal as received by the second pair of antennas from the portable remote control; and using, by the controller, at least one of the detected angles and the known location of the AoA antenna assembly to locate the portable remote control relative to the vehicle.

The first pair of antennas may operate with one of vertical polarization and horizontal polarization and the second pair of antennas may operate with the other one of vertical polarization and horizontal polarization. In this case, the method may further include, changing, by the controller, a pairing of the antennas during operation of the AoA antenna assembly.

The method may further include performing, by the controller, a passive entry operation of the vehicle as a function of the location of the portable remote control relative to the vehicle and/or a passive start operation of the vehicle as a function of the location of the portable remote control relative to the vehicle.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
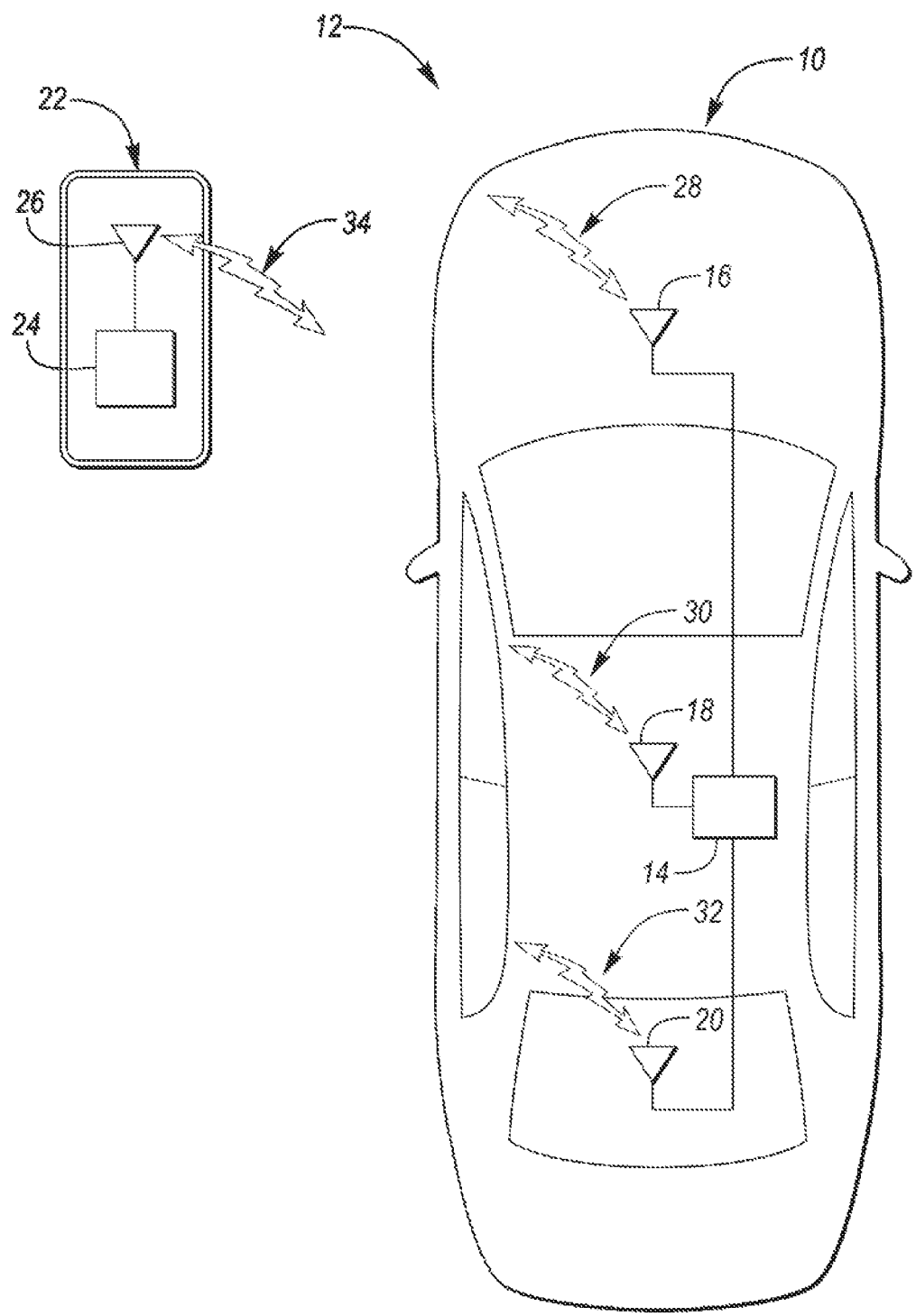
FIG. 1 illustrates a schematic diagram of a vehicle having an exemplary remote control system.

Referring now to FIG. 1, a schematic diagram of a vehicle 10 having an exemplary remote control system 12 is shown. Remote control system 12 includes a vehicle controller having a base station 14 located within vehicle 10. Base station 14 includes one or more transceiver units each having a receiver and/or transmitter which communicate with one or more antennas 16, 18, 20 positioned about vehicle 10. The transceiver units may be separate from base station 14 and may be positioned about, or included in combination with antennas 16, 18, 20. The vehicle controller is configured to operate a door lock mechanism (not shown), start the ignition of vehicle 10, and/or perform a variety of other functions related to the operation of the vehicle.

Remote control system 12 further includes a portable remote control 22. Remote control 22 is a hand-held unit to be carried by a user of vehicle 10. Conventionally, remote control 22 is a key fob. In accordance with the present disclosure, remote control 22 may be a smartphone ("phone" or "cellphone") or other consumer mobile or wearable device such as a smart watch. In this exemplary embodiment, remote control 22 is a phone. Phone 22 generally includes a controller 24 and an antenna 26. Controller 24 has a transceiver unit having a transmitter and/or receiver for transmitting and/or receiving signals. Antenna 26 is configured to send and/or receive signals to and/or from antennas 16, 18, 20.

In the operation of remote control system 12, one or more signals 28, 30, 32 may be transmitted from antennas 16, 18, 20 for receipt by phone 22 and/or received by antennas 16, 18, 20 from the phone. Likewise, one or more signals 34 may be transmitted from antenna 26 of phone 22 for receipt by antennas 16, 18, 20 and/or received by antenna 26 from antennas 16, 18, 20.

Figure 2:
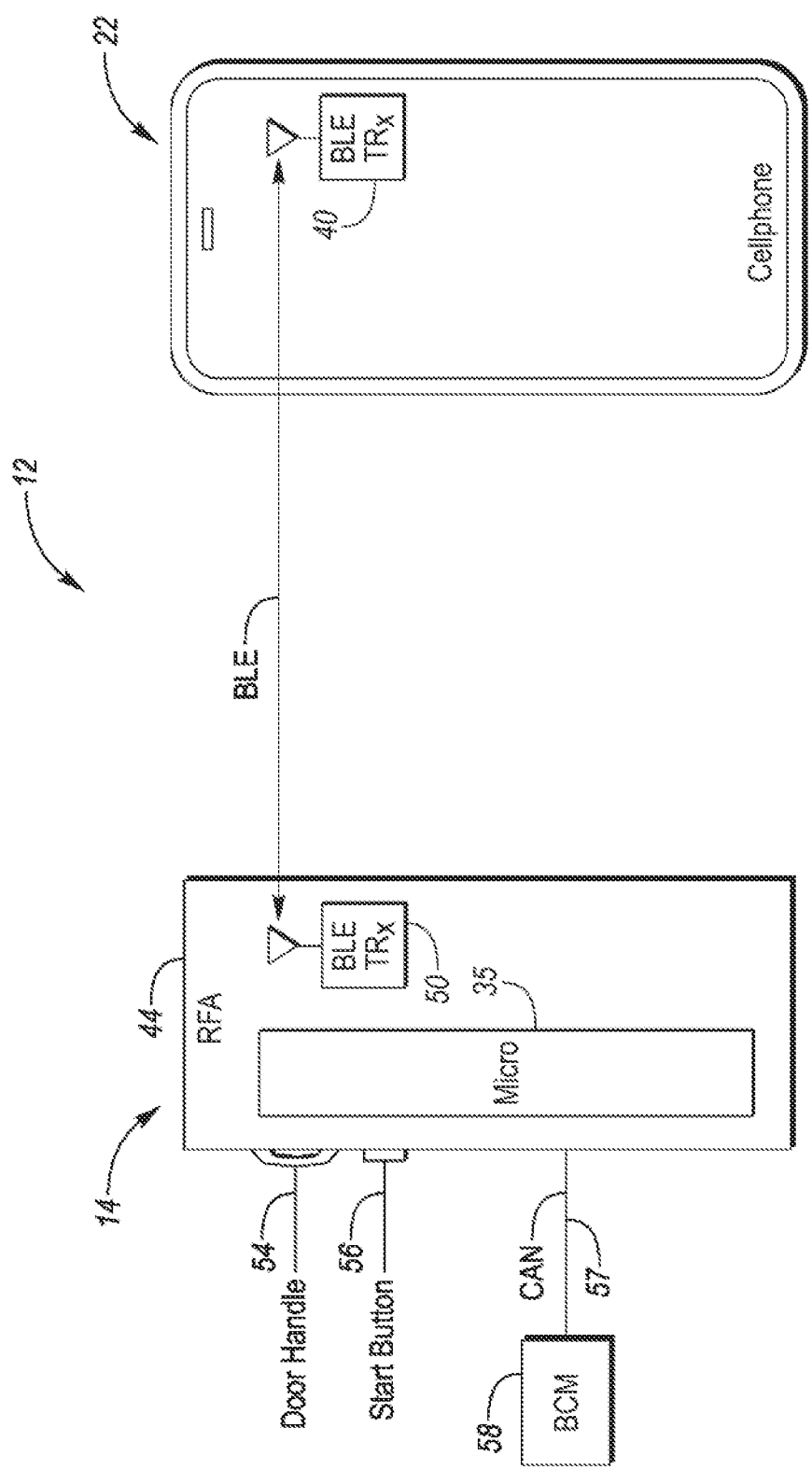
FIG. 2 illustrates a block diagram of an exemplary remote control system having (i) a portable remote control in the form of a phone and (ii) a base station.

Referring now to FIG. 2, with continual reference to FIG. 1, a block diagram of remote control system 12 is shown. As described, remote control system 12 includes phone 22 and base station 14. Base station 14 is at vehicle 10. In other embodiments, base station 14 is at a target device other than a vehicle such as a house, a garage, a gate, a building, a door, a lighting system, or the like. Base station 14 is configured to be able to control functions of vehicle 10. Phone 22 and base station 14 are operable for wirelessly transmitting/receiving signals to/from one another to enable remote control of vehicle 10.

Remote control system 12 is configured to perform passive entry passive start (PEPS) functions. PEPS capability enables remotely controlling vehicle 10 automatically (or "passively") without user actuation of phone 22. As an example of a passive entry function, base station 14 unlocks a vehicle door in response to phone 22 (which is assumed to be authorized) being detected near vehicle 10.

As shown in FIG. 2, phone 22 includes a communications circuit having a Bluetooth™ low energy (BLE) transceiver 40. In other embodiments, BLE transceiver 40 is some other type of Bluetooth™ transceiver, a Wi-Fi™ transceiver, an UWB (ultra-wideband) transceiver, or the like. BLE transceiver 40 has its own antenna as indicated in FIG. 2.

As further shown in FIG. 2, base station 14 includes a remote function actuator (RFA) 44. RFA 44 includes a communications circuit having a transceiver 50 of the same type as transceiver 40 of phone 22. As such, transceiver 50 is a BLE transceiver. In other embodiments, transceiver 50 is some other type of Bluetooth™ transceiver, a Wi-Fi™ transceiver, an UWB transceiver, or the like in correspondence with transceiver 40 of phone 22. BLE transceiver 50 has its own antenna(s) as indicated in FIG. 2. The antenna(s) associated with BLE transceiver 50 are positioned at respective locations of vehicle 10. It is noted that these are just examples of possibilities. Other possibilities include a stand-alone system or connection to RFA 44 through communication links.

As further shown in FIG. 2, RFA 44 further includes a microcontroller (or controller, processor, etc.) 55. Controller 55 monitors door handle detection input 54 and vehicle start button detection input 56 to detect user actuation of a door handle or a vehicle start button. Controller 55 handles the communication processes of base station 14 including controlling the transmitting and receiving operations of BLE transceiver 50. Controller 55 is further configured to control functions of vehicle 10. In this regard, controller 44 is in in communication via a vehicle network such as a CAN bus 57 with other vehicle controllers such as a body control module (BCM) 58.

For PEPS capability, phone 22 and base station 14 engage in a series of discovery/handshake ("handshaking") communications and authorization/authentication ("authorization") communications. The handshaking communications involve phone 22 and base station 14 being made aware of each other's presence while realizing that they are paired to one another. The authorization communications, which occur after a successful handshaking communications session, involve authorizing the enablement of a vehicle function (e.g., unlocking a vehicle door) corresponding to a detected user action. The authorization communications are intended to verify that phone 22 is authorized for remotely controlling the vehicle.

The handshaking communications involve communications between BLE transceivers 40 and 50. For example, BLE transceiver 50 of base station 14 initiates the handshaking communications by transmitting a BLE discovery signal. BLE transceiver 50 may transmit the BLE discovery signal in response to detecting a user action such as touching a door handle or may periodically transmit the BLE discovery signal. BLE transceiver 40 of phone 22 receives the BLE discovery signal from base station 14 when the phone is within the BLE communications range (i.e., within the general vicinity) of the base station during the time the BLE discovery signal was transmitted. BLE transceiver 40 of phone 22 transmits a BLE acknowledgement signal to base station. Phone 22 and base station 14 have each other's identification and are made aware that they are in the presence of one another from the phone receiving the BLE discovery signal from the base station and the base station receiving the BLE acknowledgment signal from the phone.

The handshaking communications continue with BLE transceivers 40 and 50 communicating BLE handshake-related signals with one another. The BLE handshake-related signals involve a handshaking process between phone 22 and base station 14 for each other to detect whether they are matching devices. The handshaking process makes use of the identifications of phone 22 and base station 14 which were previously communicated between the phone and the base station. Phone 22 and base station 14 are matching devices when they have been previously paired with another. If phone 22 and base station 14 detect each other as being matching devices, then the handshaking communications session is successful with the phone and the base station realizing that they are in the presence of one another and that they are matching devices.

Upon the handshaking communications session being successful, the authorization communications begin. The authorization communications may involve transmitters and/or receivers of phone 22 and/or base station 14 different than BLE transceivers 40 and 50. The authorization communications generally include base station 14 transmitting a challenge signal to phone 22 and the phone transmitting an answer signal back to the base station. If the answer satisfies the challenge, then base station 14 determines phone 22 to be authorized for remotely controlling vehicle 10 and authorizes enablement of a corresponding vehicle function (e.g., unlocking a vehicle door). It is noted that the challenge signal process may be handled differently or may be absent altogether.

Figure 3:
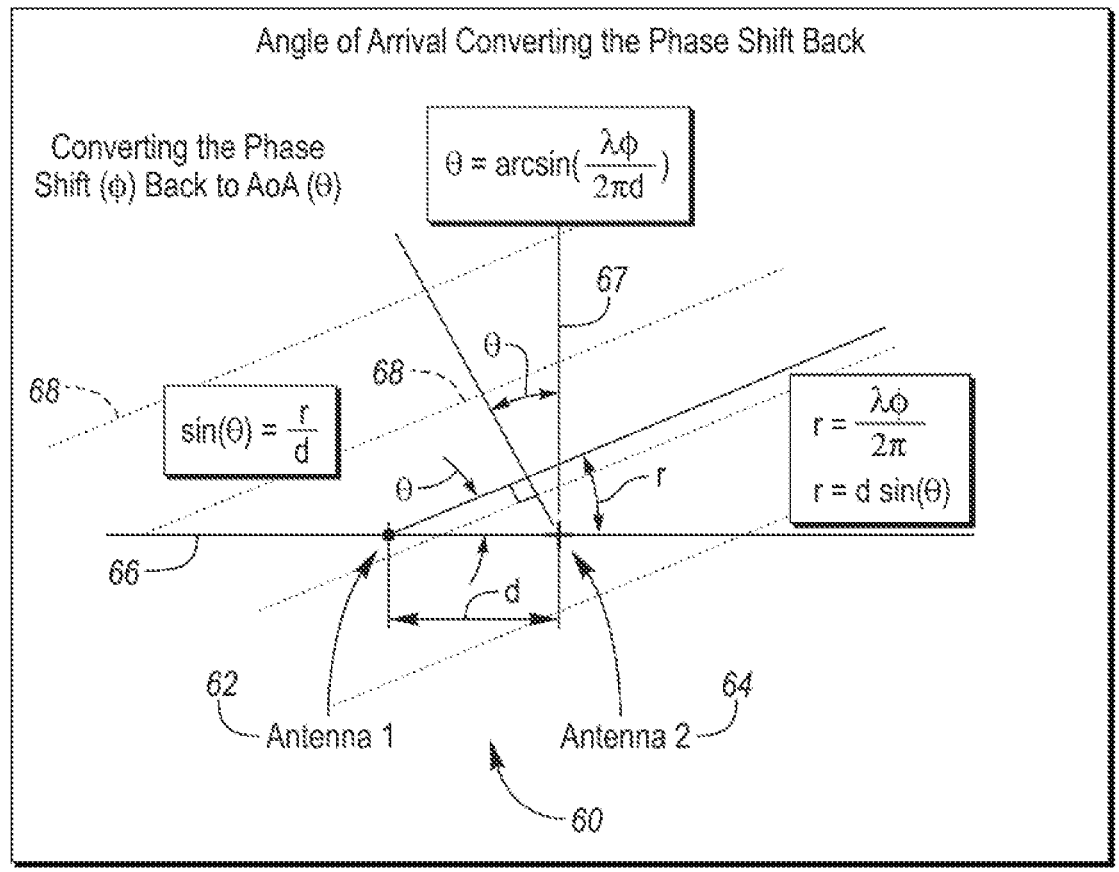
FIG. 3 illustrates a schematic diagram depicting operation of an antenna assembly of the base station for detecting an angle of arrival (AoA) of a received signal from the phone.

Referring now to FIG. 3, with continual reference to FIGS. 1 and 2, a schematic diagram depicting operation of an antenna assembly 60 of base station 14 for detecting an angle of arrival (AoA) of a received signal from phone 22 is shown. The main function of antenna assembly 60 is to detect the angle from which wireless signals for receipt by base station 14 are emanating from phone 22.

Antenna assembly 60 is part of base station 14. Antenna assembly 60 is configured to receive wireless communication signals from phone 22. Particularly, antenna assembly 60 is configured to receive BLE communication signals from BLE transceiver 40 of phone 22. As such, antenna assembly 60 may be one of the antennas associated with BLE transceiver 50 of base station 14. Alternatively, antenna assembly 60 may be an additional antenna assembly associated with BLE transceiver 50 or its own BLE transceiver.

Base station 14 includes a plurality (e.g., six to eight) antenna assemblies 60 positioned at respective locations about vehicle 10. Particularly, antenna assemblies 60 are positioned about vehicle 10 to provide BLE signal reception coverage across the entire vehicle structure. Of course, base station 14 may include as few as just one antenna assembly 60.

As shown in FIG. 3, antenna assembly 60 includes a first antenna 62 and a second antenna 64. Antennas 62 and 64 are spaced apart from one another at distance "d" along a first line of reference 66. A second reference line 67 is normal to first reference line 66. In operation, antenna assembly 60 is in listen mode to detect a BLE signal from phone 22. A BLE signal from phone 22 approaching antenna assembly 60 has a wavefront 68 relative to the position of antennas 62 and 64. Consequently, for instance as shown in FIG. 3, wavefront 68 of the received BLE signal is incident firstly onto first antenna 62 and then onto second antenna 64. The phase difference $\Phi$ is the difference between (i) the phase of wavefront 68 of the BLE signal as received by first antenna 62 and (ii) the phase of wavefront 68 of the BLE signal as received by second antenna 64. Based on the difference of when wavefront 68 strikes first antenna 62 and then second antenna 64, an angle of arrival (AoA) "$\Theta$" of the received BLE signal can be determined using geometry as described in FIG. 3.

Each antenna assembly 60 which receives BLE signal detects its own angle of arrival (AoA) "Θ". As the positions of antenna assemblies 60 on vehicle 10 are different from one another, the AoA "Θ" for each antenna assembly 60 will also be different. For instance, a first antenna assembly 60 detects $Θ_1$, a second antenna assembly 60 detects $Θ_2$, etc. Controller 55 analyzes all the detected AoA "Θ" in conjunction with the known positions of antenna assemblies 60 to determine the location of phone 22 relative to vehicle 10. Controller 55 may further use RSSI (received signal strength indicator) information in determining the location of phone 22. Such RSSI information may be measured and provided by phone 22 and/or measured and provided by base station 14.

Figure 4A:
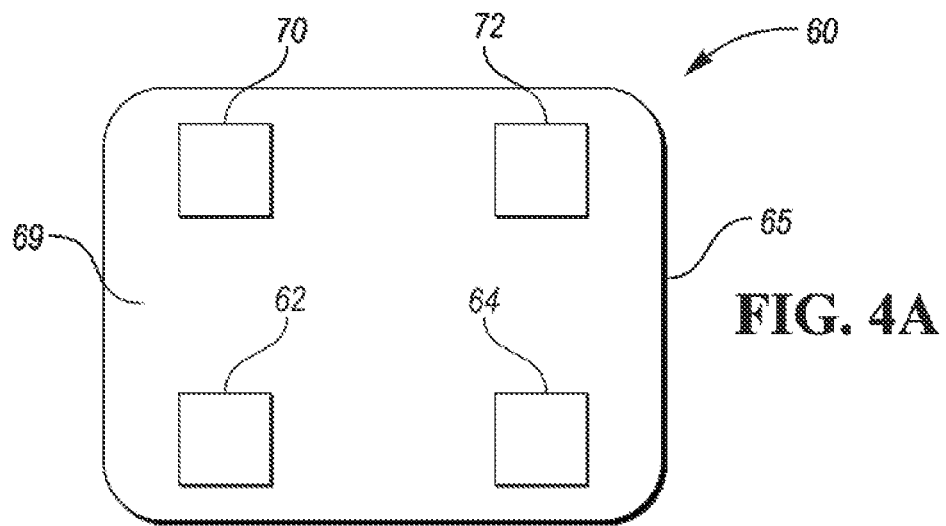
FIG. 4A illustrates a top layer view of the AoA antenna assembly.
Figure 4B:
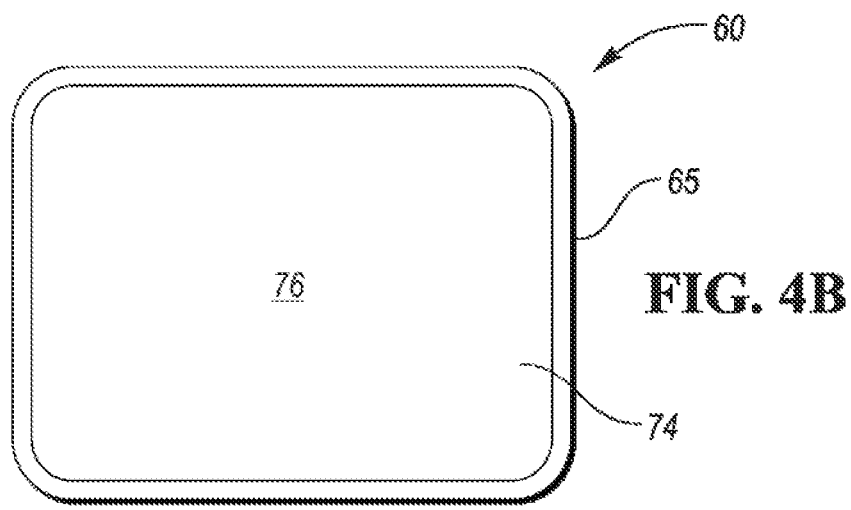
FIG. 4B illustrates an intermediate layer view of the AoA antenna assembly.
Figure 4C:
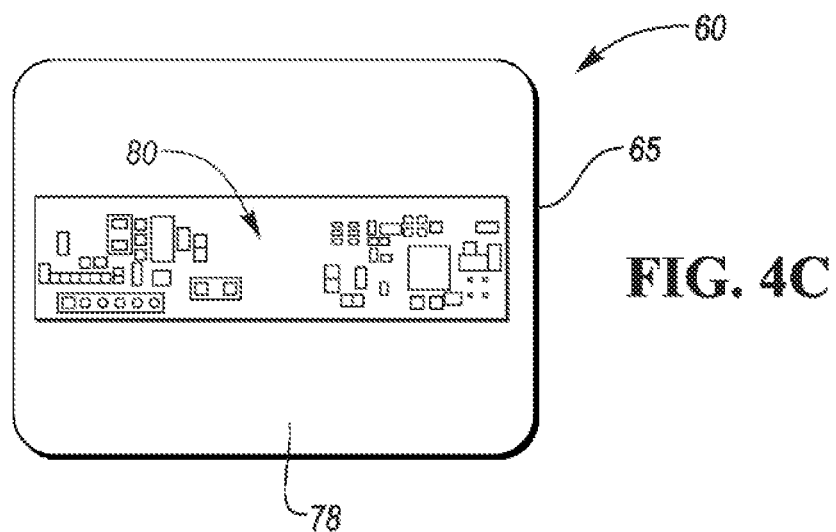
FIG. 4C illustrates a bottom layer view of the AoA antenna assembly.

Referring now to FIGS. 4A, 4B, and 4C, top, intermediate, and bottom layer views of AoA antenna assembly 60 are shown. Initially, it is noted that the frame of reference of "top" and "bottom" layers of AoA antenna assembly 60 is just an example and the orientation of the AoA antenna assembly may be such that the top and bottom layers are bottom and top layers, respectively.

Antenna assembly 60 includes a printed circuit board (PCB) 65. FIG. 4A illustrates the top layer 69 of PCB 65. First antenna 62 and second antenna 64 are on top layer 69 of PCB 65. First and second antennas 62 and 64 form a first pair of antennas of antenna assembly 60. Antenna assembly 60 may further include a third antenna 70 and a fourth antenna 72, which form a second pair of antennas of antenna assembly 60.

Antennas 62, 64, 70, and 72 may operate with circular polarization. In this case, second pair of antennas 70 and 72 are provided to provide antenna assembly 60 with spatial diversity. The spatial diversity is provided as first pair of antennas 62 and 64 are positioned along a first line of reference whereas second pair of antennas 70 and 72 are positioned along a second line of reference generally parallel to and spaced apart from the first line of reference.

Antennas 62, 64, 70, and 72 may operate with dual linear or dual perpendicular polarization. For instance, first pair of antennas 62 and 64 operate with vertical polarization whereas second pair of antennas 70 and 72 with horizontal polarization. Alternatively, first pair of antennas 62 and 64 operate with horizontal polarization whereas second pair of antennas 70 and 72 with vertical polarization.

Antennas 62, 64, 70, 72 may be patch antennas. Antennas 62, 64, 70, and 72 can be implemented as PCB traces, ceramic patch antennas which are placed on PCB 65, or some other SMD type of antenna. PCB copper pattern for antennas 62, 64, 70, 72 is preferred.

FIG. 4B illustrates an intermediate layer 74 of PCB 65. Intermediate layer 74 is "intermediate" in that it is within PCB 65 between top layer 68 and the bottom layer of PCB 65. Intermediate layer 74 is in the form of a ground plane 76. In other embodiments, intermediate layer 74 is a partial ground plane or is not a ground plane at all.

FIG. 4C illustrates the bottom layer 78 of PCB 65. Electronic components 80 are placed on bottom layer 76 of PCB 65. Electronic components 80 connect to antennas 62, 64, 70, 72 to enable the operation of antenna assembly 60.

The antenna feeds are not shown in FIGS. 4A, 4B, and 4C. The antenna feeds can be implemented by a connected PCB trace or a coupled PCB trace (non-contact). A proper feed design avoiding feed radiation interfering with antenna radiation while maintaining proper impedance matching and polarization is utilized.

Antennas 62, 64, 70, and 72 can have different geometric designs than depicted in FIG. 4A. Antennas 62, 64, 70, and 72 are in a square/rectangular configuration for space saving and for RF multipath mitigation. Antennas 62, 64, 70, 72 preferably operate at a 100 MHz bandwidth with a center frequency of 2.4425 GHz.

Antenna assembly 60 may have four or more antennas which are patch antennas and which may be paired differently than described. For instance, as one example, first and third antennas 62 and 70 may be paired with one another and second and fourth antennas 64 and 72 may be paired with one another. Controller 55 may control the signal processing to implement the pairing of the antennas and may change the pairing during the operation of antenna assembly 60.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A base station of a vehicle comprising:
an angle of arrival (AoA) antenna assembly positioned at a known location of the vehicle, the AoA antenna assembly including a first pair of antennas on an outer layer of a printed circuit board (PCB), the first pair of antennas including a first antenna and a second antenna spaced apart from one another along a first line, the AoA antenna assembly to detect an angle of arrival of a wireless signal as received by the AoA antenna assembly from a portable remote control based on a difference between (i) when a wavefront of the wireless signal is incident on the first antenna and (ii) when the wavefront of the wireless signal is incident on the second antenna;
a controller to use the detected angle of arrival and the known location of the AoA antenna assembly to locate the portable remote control relative to the vehicle; and
wherein the controller is operable to perform a passive entry operation of the vehicle as a function of the location of the portable remote control relative to the vehicle and/or a passive start operation of the vehicle as a function of the location of the portable remote control relative to the vehicle.

2. The base station of claim 1 further comprising:
a plurality of the AoA antenna assemblies positioned at respective known locations of the vehicle; and
the controller to further use detected angles of arrival of the wireless signal as received by the plurality of AoA antenna assemblies and the known locations of the plurality of AoA antenna assemblies to locate the portable remote control relative to the vehicle.

3. The base station of claim 1 wherein:
the wireless signal is a Bluetooth™ wireless signal or a Bluetooth™ low energy (BLE) wireless signal.

4. The base station of claim 3 wherein:
the portable remote control is a phone.

5. The base station of claim 1 wherein:
the wireless signal is a Bluetooth™ wireless signal, a Bluetooth™ low energy (BLE), a Wi-Fi™ wireless signal, or an ultra-wideband (UWB) wireless signal; and
the portable remote control is a phone or a key fob.

6. The base station of claim 1 wherein:
the AoA antenna assembly further includes a second pair of antennas on the outer layer of the PCB, the second pair of antennas includes a third antenna and a fourth antenna spaced apart from one another along a second line spaced apart from and parallel to the first line, the AoA antenna assembly to detect the angle of arrival of the wireless signal as received by the AoA antenna assembly from the portable remote control based on a difference between (i) when the wavefront of the wireless signal is incident on the third antenna and (ii) when the wavefront of the wireless signal is incident on the fourth antenna.

7. The base station of claim 6 wherein:
the first pair of antennas operate with one of vertical polarization and horizontal polarization and the second pair of antennas operate with the other one of vertical polarization and horizontal polarization.

8. The base station of claim 6 wherein:
the controller is operable to implement a pairing of the antennas and to change the pairing of the antennas during operation of the AoA antenna assembly.

9. The base station of claim 1 wherein:
the antennas operate with circular polarization, vertical polarization, or horizontal polarization.

10. The base station of claim 1 wherein:
the antennas are implemented as PCB trace antennas, patch antennas, or surface mount antennas other than patch antennas.

11. The base station of claim 1 wherein:
the AoA antenna assembly further includes a ground plane, wherein the ground plane is an intermediate layer of the PCB; and
the AoA antenna assembly further includes a plurality of electronic components, wherein the electronic components are on an outer layer of the PCB opposite to the outer layer of the PCB on which the antennas are on, wherein the electronic components are connected to the antennas to enable the operation of the AoA antenna assembly.

12. The base station of claim 1 wherein:
the antennas operate at a 100 MHz bandwidth with a center frequency of 2.4425 GHz.

13. A method for use by a base station of a vehicle, wherein the base station includes an angle of arrival (AoA) antenna assembly and a controller, the AoA antenna assembly being positioned at a known location of the vehicle and including a first pair of antennas on a printed circuit board (PCB), the first pair of antennas including a first antenna and a second antenna spaced apart from one another along a first line, the method comprising:
detecting, by the AoA antenna assembly, an angle of arrival of a wireless signal as received by the AoA antenna assembly from a portable remote control based on a difference between (i) when a wavefront of the wireless signal is incident on the first antenna and (ii) when the wavefront of the wireless signal is incident on the second antenna;
using, by the controller, the detected angle of arrival and the known location of the AoA antenna assembly to locate the portable remote control relative to the vehicle; and
performing, by the controller, a passive entry operation of the vehicle as a function of the location of the portable remote control relative to the vehicle and/or a passive start operation of the vehicle as a function of the location of the portable remote control relative to the vehicle.

14. The method of claim 13, wherein the base station further includes a plurality of the AoA antenna assemblies positioned at respective known locations of the vehicle, the method further comprising:
detecting, by the controller, angles of arrival of the wireless signal as received by the plurality of AoA antenna assemblies from the portable remote control; and
using, by the controller, the detected angles of arrival and the known locations of the plurality of AoA antenna assemblies to locate the portable remote control relative to the vehicle.

15. The method of claim 13 wherein:
the wireless signal is a Bluetooth™ wireless signal or a Bluetooth™ low energy (BLE) wireless signal; and
the portable remote control is a phone.

16. The method of claim 13 wherein:
the wireless signal is a Bluetooth™ wireless signal, a Bluetooth™ low energy (BLE), a Wi-Fi™ wireless signal, or an ultra-wideband (UWB) wireless signal; and
the portable remote control is a phone or a key fob.

17. The method of claim 13, wherein the AoA antenna assembly further includes a second pair of antennas on the PCB, the second pair of antennas includes a third antenna and a fourth antenna spaced apart from one another along a second line spaced apart from and parallel to the first line, the method further comprising:
detecting, by the AoA antenna assembly, another angle of arrival of the wireless signal as received by the AoA antenna assembly from the portable remote control based on a difference between (i) when the wavefront of the wireless signal is incident on the third antenna and (ii) when the wavefront of the wireless signal is incident on the fourth antenna; and
using, by the controller, at least one of the detected angle of arrivals and the known location of the AoA antenna assembly to locate the portable remote control relative to the vehicle.

18. The method of claim 17, wherein the first pair of antennas operate with one of vertical polarization and horizontal polarization and the second pair of antennas operate with the other one of vertical polarization and horizontal polarization, the method further comprising:
changing, by the controller, a pairing of the antennas during operation of the AoA antenna assembly.

* * * * *